(12) United States Patent
Liu et al.

(10) Patent No.: US 11,881,015 B2
(45) Date of Patent: Jan. 23, 2024

(54) HIGH-PRECISION IDENTIFICATION METHOD AND SYSTEM FOR SUBSTATIONS

(71) Applicant: Shanghai Jiaotong University, Shanghai (CN)

(72) Inventors: Yadong Liu, Shanghai (CN); Yingjie Yan, Shanghai (CN); Siheng Xiong, Shanghai (CN); Ling Pei, Shanghai (CN); Zhe Li, Shanghai (CN); Peng Xu, Shanghai (CN); Lei Su, Shanghai (CN); Xiaofei Fu, Shanghai (CN); Xiuchen Jiang, Shanghai (CN)

(73) Assignee: Shanghai Jiaotong University, Shanghai (CN)

( * ) Notice: Subject to any disclaimer, the term of this patent is extended or adjusted under 35 U.S.C. 154(b) by 353 days.

(21) Appl. No.: 17/433,994

(22) PCT Filed: Jun. 8, 2020

(86) PCT No.: PCT/CN2020/094891
§ 371 (c)(1),
(2) Date: Aug. 25, 2021

(87) PCT Pub. No.: WO2021/248269
PCT Pub. Date: Dec. 16, 2021

(65) Prior Publication Data
US 2022/0343642 A1    Oct. 27, 2022

(51) Int. Cl.
*G06V 10/94* (2022.01)
*G06V 10/82* (2022.01)
(Continued)

(52) U.S. Cl.
CPC ............. *G06V 10/95* (2022.01); *G06N 3/044* (2023.01); *G06T 7/60* (2013.01); *G06T 7/73* (2017.01);
(Continued)

(58) Field of Classification Search
CPC ........ G06V 10/95; G06V 10/32; G06V 10/40; G06V 10/82; G06V 10/22; G06V 10/776;
(Continued)

(56) References Cited

U.S. PATENT DOCUMENTS

2020/0026956 A1   1/2020  Kumar et al.
2021/0089833 A1*  3/2021  Anantha ................ G06V 10/82

FOREIGN PATENT DOCUMENTS

CN         106228193 A     12/2016
CN         109712118 A      5/2019
(Continued)

*Primary Examiner* — David F Dunphy
(74) *Attorney, Agent, or Firm* — Idea Intellectual Limited; Margaret A. Burke; Sam T. Yip

(57) ABSTRACT

The present invention provides a high-precision identification method and system for substations, including building a Mask RCNN objection recognition network model based on convolutional neural networks; inputting acquired image information of a object into the Mask RCNN object recognition network model for preliminary recognition and outputting a recognition result of the object; using an information entropy to create a semantic decision tree and correcting the recognition result of the object according to a principle of relative correlation between different objects and outputting a final recognition decision result; reading the recognition decision result to obtain a true type of the object to be recognized. The present invention greatly improves the accuracy of image recognition of substations, and has a positive role in the research and development of automatic inspection equipment for inspection robots.

10 Claims, 5 Drawing Sheets

(51) Int. Cl.
  *G06V 10/776* (2022.01)
  *G06V 10/764* (2022.01)
  *G06V 10/22* (2022.01)
  *G06V 10/40* (2022.01)
  *G06T 7/73* (2017.01)
  *G06T 7/60* (2017.01)
  *G06V 10/32* (2022.01)
  *G06N 3/044* (2023.01)

(52) U.S. Cl.
  CPC .............. *G06V 10/22* (2022.01); *G06V 10/32* (2022.01); *G06V 10/40* (2022.01); *G06V 10/764* (2022.01); *G06V 10/776* (2022.01); *G06V 10/82* (2022.01); *G06T 2207/20084* (2013.01)

(58) Field of Classification Search
  CPC ........... G06V 10/764; G06T 7/73; G06T 7/60; G06T 2207/20084; G06N 3/044
  See application file for complete search history.

(56) References Cited

FOREIGN PATENT DOCUMENTS

| | | |
|---|---|---|
| CN | 110782461 A | 2/2020 |
| CN | 111222574 A | 6/2020 |

\* cited by examiner

HIGH-PRECISION IDENTIFICATION METHOD AND SYSTEM FOR SUBSTATIONS

CROSS-REFERENCE TO RELATED APPLICATIONS

This application is a 371 application of the International Patent Application No. PCT/CN2020/094891 filed on Jun. 8, 2020, and the disclosures of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the technical field of image recognition. More specifically, it relates to a high-precision identification method and system for substations.

BACKGROUND

At present, as there is a structural labor shortage in power supply companies, inspection robots are widely used in substations. However, the inspection robots still only maintain at the level of perceptual intelligence but not cognitive intelligence. In order to enable the inspection robots to automatically diagnose the fault of the substations, object recognition has become a key step because different equipment corresponds to different testing standards.

Traditional image recognition methods perform relatively better on large sample data sets, but because there are only very few image samples of the conventional power equipment that can be obtained, the accuracy of traditional recognition methods is therefore not high, making industrialization thereof impossible. Nevertheless, substations have a strong correlation with each other. The probability of having a specific type of device in common among the substations is thereby higher. If such a correlation relationship is introduced into image recognition, the accuracy of recognition can be greatly enhanced, making industrialization thereof possible.

SUMMARY OF THE INVENTION

This section aims to summarize some aspects of the embodiments of the present invention and to briefly describe some preferred embodiments. Simplification or omission may be made in this section, the abstract of the specification, and the title to avoid obscuring the purposes of this section, the abstract of the specification, and the title. Such simplification or omission may not be used to limit the scope of the present invention.

The present invention is made in view of the technical problems as above-mentioned.

Therefore, according to one aspect of the present invention, there is provided a high-precision identification method and system for improving accuracy of device recognition at substations.

To solve the technical problems as above-mentioned, the present invention provides the following solutions: a method including building a Mask RCNN objection recognition network model based on convolutional neural networks; inputting acquired image information of an object into the Mask RCNN object recognition network model for preliminary recognition and outputting a recognition result of the object; using an information entropy to create a semantic decision tree and correcting the recognition result of the object according to the principle of relative correlation between different objects and outputting a final recognition decision result; reading the recognition decision result to obtain a true type of the object to be recognized.

Being a preferred embodiment of the high-precision identification method for substations in the present invention, the method of building the Mask RCNN object recognition network model includes superimposing a plurality of residual networks ResNet, y=F(x)+x; establishing a region generative network, $P_i=FC_2[FC_1[Pooling(f,R_i)]]$, and setting a threshold of 0.5, keeping a candidate region if $P_i$ exceeds 0.5, and discarding the candidate region if $P_i$ is lower than 0.5; generating a taxonomy branch, $P_c^i=FC_4[FC_3[Pooling(f, R_i')]]$; generating a mask branch, $M_i=FC_6[FC_5[Pooling(f, R_i')]]$, where y is an output of the residual network; x is an input of the residual network; F is a convolution function; f is an image feature outputted by the residual network; $R_i$ is the candidate region; Pooling is pooling; $FC_1$ and $FC_2$ are first and second fully connected layers, respectively; $P_i$ is probability of candidate region $R_i$ belonging to a foreground (i.e., the region containing the object to be recognized); $R_i'$ is kept candidate region; $FC_3$ and $FC_4$ are third and fourth fully connected layers, respectively; $P_c^i$ is probability of the object c to be recognized in the candidate region $R_i'$, $FC_5$ and $FC_6$ are fifth and sixth fully connected layers, respectively; a matrix $M_i$ has pixel size identical to the candidate region $R_i'$; and each position in the $M_i$ represents a probability that the pixel point belongs to the recognized object in the candidate region.

Being a preferred embodiment of the high-precision identification method for substations in the present invention, the preliminary recognition includes using the residual network to extract the image feature; positioning the object to be recognized by the region generative network using a corresponding image feature(s), and sending the respective feature(s) of the positioned region to the taxonomy branch and the mask branch; recognizing the type of the object to be recognized through the taxonomy branch; and positioning the pixel point of the object to be recognized in the image through the mask branch.

Being a preferred embodiment of the high-precision identification method for substations in the present invention, the recognition result of the object includes a type, an orientation and a size thereof.

Being a preferred embodiment of the high-precision identification method for substations in the present invention, the image information needs to be pre-processed, including normalizing orientation and size of other objects in an adjacent area of a central object; and positioning the orientation and the size of the central object as $d_p^o$ and $d_s^o$, respectively, where the normalized orientation and size are as follows, $$d'^i_p = d_p^i - d_p^o,$$

$$d'^i_s = d_s^i / d_s^o.$$

Being a preferred embodiment of the high-precision identification method for substations in the present invention, the semantic decision tree includes an input layer and an output layer, where the input layer includes information of the central object and the other objects within the same region thereof; the output layer includes a correction result corresponding to the central object.

Being a preferred embodiment of the high-precision identification method for substations in the present invention, creating the semantic decision tree includes type and position information of each object as follows:

$$d=\{d_c, d_p, d_s\},$$

where $d_c$ is a recognition category, $d_s$ is a recognition size, and $d_p$ is a recognition orientation; combining the normalized orientation and size, and fusing the corresponding correction results of the central object to create the semantic decision tree, as follows:

$$g_c^{(i)}=Tree(d_c^{(i)}, d_c^{(i1)}, d'_p{}^{(i1)}, d'_s{}^{(i1)}, \ldots, d_c^{(in)}, d'_p{}^{(in)}, d'_s{}^{(in)}),$$

where $d^{(i)}$ is the central object, $d^{(i1)} \ldots d^{(in)}$ are other objects within the same region of the central object, and $g_c^i$ is the semantic decision tree.

Being a preferred embodiment of the high-precision identification method for substations in the present invention, the correction includes defining the objection recognition result as a total of N objects $d_c^i$ (i=1 ... N), and using the semantic decision tree to correct each of the N objects, respectively; generating the following three judging criteria with respect to recognition category, recognition size and recognition orientation, respectively:

$d_c \in S_C$, for determining whether it belongs to a set $S_C$;

$d_s > T_s$, for determining whether the size exceeds a threshold $T_s$;

$d_p \in R_p$, for determining whether the position is in a region of $R_p$;

determining whether an attribute of the image information satisfies input conditions according to the three judging criteria, and using a number that satisfies the three criteria to judge the true type of the central object.

Being a preferred embodiment of the high-precision identification method for substations in the present invention, the recognition decision result is the result corrected by the semantic decision tree as follows:

$$g_c^i (i=1 \wedge N),$$

where N is the number of the objects in the recognition result.

Being a preferred embodiment of the high-precision identification system for substations in the present invention, the system includes an acquisition module acquiring an image information and related relationship information between the substations; a data processing center module is connected to the acquisition module for receiving, calculating, storing, outputting the data information to be processed, where the data processing center module contains an arithmetic unit, a database and an input-output management unit; the arithmetic unit connects to the acquisition module for receiving the data information obtained from the acquisition module to perform correction and normalization and calculate the type, size and position data; the database connects to each module for storing all the received data information to provide the data processing center module an allocation and supply service; the input-output management unit receives information of each module and outputs an operation result of the arithmetic unit; an analysis and judgment module is connected to the data processing center module for receiving the operation result of the arithmetic unit, and through three judging criteria including recalling a decoder to analyze and determine whether it belongs to a set $S_C$, whether the size exceeds a threshold $T_s$, whether the position is in a region of $R_p$, and summarize the result to judge the true type of a central object; and a display module is connected to the analysis and judgment module for reading the judgment result of the analysis and judgment module to perform data presentation.

The present invention has the following advantages: the present invention performs preliminary recognition through the Mask RCNN object recognition network model, performs secondary judgment and correction recognition in combination with a semantic decision tree, and uses the relative correlation between substations to fuse image features on the basis of increasing the judging criteria to obtain the true type. This greatly improves the accuracy of image recognition of substations, and has a positive role in the research and development of automatic inspection equipment for inspection robots.

BRIEF DESCRIPTION OF THE DRAWINGS

In order to more clearly illustrate the technical solutions of the embodiments of the present invention, the following will briefly introduce the drawings needed to be used in the description of the embodiments. Obviously, the drawings in the following description are only some embodiments of the present invention. For those of ordinary skill in the art, other drawings can be obtained based on these drawings without any creative labor, in which.

DETAILED DESCRIPTION

Figure 1:
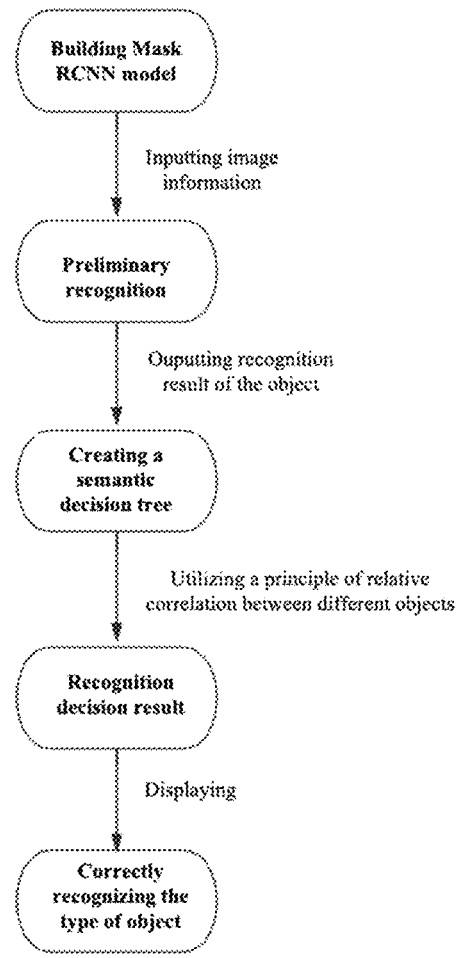
FIG. 1 depicts a schematic flowchart of the high-precision identification method for substations according to the first embodiment of the present invention.

To make the above-mentioned objectives, features and advantages more easily be understood, the specific embodiments of the present invention will be described in detail below in conjunction with the accompanying drawings of the specification. Obviously, the described embodiments are a part but not all embodiments of the present invention. Based on the embodiments of the present invention, all other embodiments obtained by a person skilled in the art without any creative labor shall fall within the protection scope of the present invention.

Although the following descriptions illustrate in detail in order to facilitate understanding of the present invention, it should be understood by a skilled person in the art that the present invention can also be enabled by other ways not described herein. The skilled person in the art can also implement the present invention without departing from the spirit of the present invention such that the following descriptions concerning the examples will not limit the present invention.

In addition, the expressions "an embodiment" or "an example" used herein refers to including specific features, structure and characteristics of at least one embodiment of the present invention. "According to an embodiment of the present invention" appears in the present disclosure does not necessarily mean that it refers to the same embodiment, or it does not necessarily mean that it independently or selectively contradicts with one another.

The present invention is described in detail in combination with schematic diagrams. When describing the embodiments of the present invention in detail, for the convenience of description, the cross-sectional view showing the equipment structure will not be partially enlarged in accordance with the general real scale, and the schematic diagram is only an example, which should not limit the protection scope of the present invention. Moreover, the three-dimensional dimensions of length, width and depth should be included during actual production.

Meanwhile, in the description of the present invention, it should be noted that the orientation or positional relationship indicated by the term "up, down, inside and outside" are based on the orientation or positional relationship shown in the drawings. This is only for the convenience of describing the present invention and simplifying the description, and does not indicate or imply that the said equipment or element must have a specific orientation or be constructed and operated in a specific orientation, so it cannot be construed as a limitation of the present invention. Moreover, the term "first, second, or third" is only used for descriptive purposes, and cannot be understood as indicating or implying relative importance.

Unless otherwise clearly defined and limited in the present invention, the term "installation, connection, link" should be understood in a broad sense. For example, it can be fixed connection, detachable connection or one-piece connection; as well as mechanical connection, electrical connection or direct connection. Also, it can be connected indirectly through an intermediary, or through interconnection between two elements. For those of ordinary skill in the art, the specific meaning of the above-mentioned terms in the present invention can be specifically understood.

Example 1

Referring to FIGS. 1-4, which belong to the first embodiment of the present invention. Such embodiment provides a high-precision identification method for substations, including:

S1: building a Mask RCNN objection recognition network model based on convolutional neural networks. It should be noted that the method of building a Mask RCNN objection recognition network model includes:

superimposing a plurality of residual network ResNet, $y=F(x)+x$;

establishing a region generative network, $P_i=FC_2[FC_1[Pooling(f,R_i)]]$, and setting a threshold of 0.5, keeping a candidate region if $P_i$ exceeds 0.5, and discarding the candidate region if $P_i$ is lower than 0.5;

generating a taxonomy branch, $P_c^i=FC_4[FC_3[Pooling(f, R_i')]]$;

generating a mask branch, $M_i=FC_6[FC_5[Pooling(f, R_i')]]$;

where y is an output of the residual network, x is an input of the residual network, F is a convolution function, f is an image feature outputted by the residual network, $R_i$ is the candidate region, Pooling is pooling, $FC_1$ and $FC_2$ are first and second fully connected layers, respectively, $P_i$ is probability of candidate region $R_i$ belonging to a foreground (i.e., the region containing the object to be recognized), $R_i'$ is kept candidate region, $FC_3$ and $FC_4$ are third and fourth fully connected layers, respectively, $P_c^i$ is probability of the object c to be recognized in the candidate region $R_i'$, $FC_5$ and $FC_6$ are fifth and sixth fully connected layers, respectively, a matrix $M_i$ has pixel size identical to the candidate region $R_i'$, and each position in the $M_i$ represents a probability that the pixel point belongs to the recognized object in the candidate region.

S2: inputting acquired image information of an object into the Mask RCNN object recognition network model for preliminary recognition and outputting a recognition result of the object. What needs to be explained in this step is that preliminary recognition includes:

using the residual network to extract the image feature;
positioning the object to be recognized by the region generative network using a corresponding image feature(s), and sending the respective feature(s) of the positioned region into the taxonomy branch and the mask branch;
recognizing the type of the object to be recognized through the taxonomy branch; and
positioning the pixel point of the object to be recognized in the image through the mask branch.

Specifically, the recognition result of the object includes a type, an orientation and a size thereof.

Furthermore, the image information needs to be pre-processed, including:

normalizing orientation and size of other objects in an adjacent area of a central object; and
positioning the orientation and the size of the central object as $d_p^o$ and $d_s^o$, respectively, where the normalized orientation and size are as follows:

$$d'^i_p = d^i_p - d^o_p,$$

$$d'^i_s = d^i_s / d^o_s.$$

S3: using an information entropy to create a semantic decision tree and correcting the recognition result of the object according to the principle of relative correlation between objects, and outputting a final recognition decision result. It should also be noted that the method of creating the semantic decision tree comprises type and position information of each object as follows:

$$d = \{d_c, d_p, d_s\},$$

where $d_c$ is a recognition category, $d_s$ is a recognition size, and $d_p$ is a recognition orientation;

combining the normalized orientation and size, and fusing the corresponding correction results of the central object to create the semantic decision tree, as follows:

$$g_c^{(i)} = \text{Tree}(d_c^{(i)}, d_c^{(i1)}, d'^{(i1)}_p, d'^{(i1)}_s, \ldots d_c^{(in)}, d'^{(in)}_p, d'^{(in)}_s),$$

where $d^{(i)}$ is the central objection, $d^{(i1)} \ldots d^{(in)}$ are other objects within the same region of the central object, and $g_c^i$ is the semantic decision tree.

Specifically, the semantic decision tree includes an input layer and an output layer, where the input layer contains information of the central object and the other objects within the same region thereof; the output layer contains a correction result corresponding to the center object.

Further, the correction includes:
defining the objection recognition result as a total of N objects $d_c^i$ (i=1 ... N), and using the semantic decision tree to correct each of the N objects, respectively;
generating the following three judging criteria with respect to recognition category, recognition size and recognition orientation, respectively:
$d_c \in S_C$, for determining whether it belongs to a set $S_C$;
$d_s > T_s$, for determining whether the size exceeds a threshold $T_s$;
$d_p \in R_p$, for determining whether the position is in a region of $R_p$;
determining whether an attribute of the image information satisfies input conditions according to the three judging criteria, and using a number that satisfies the three criteria to judge the true type of the central object.

S4: reading the recognition decision result to obtain a true type of the object to be recognized. What needs to be explained in this step is: the recognition decision result is the result corrected by the semantic decision tree as follows:

$$g_c^i (i=1 \wedge N),$$

where N is the number of the objects in the recognition result.

Figure 2:
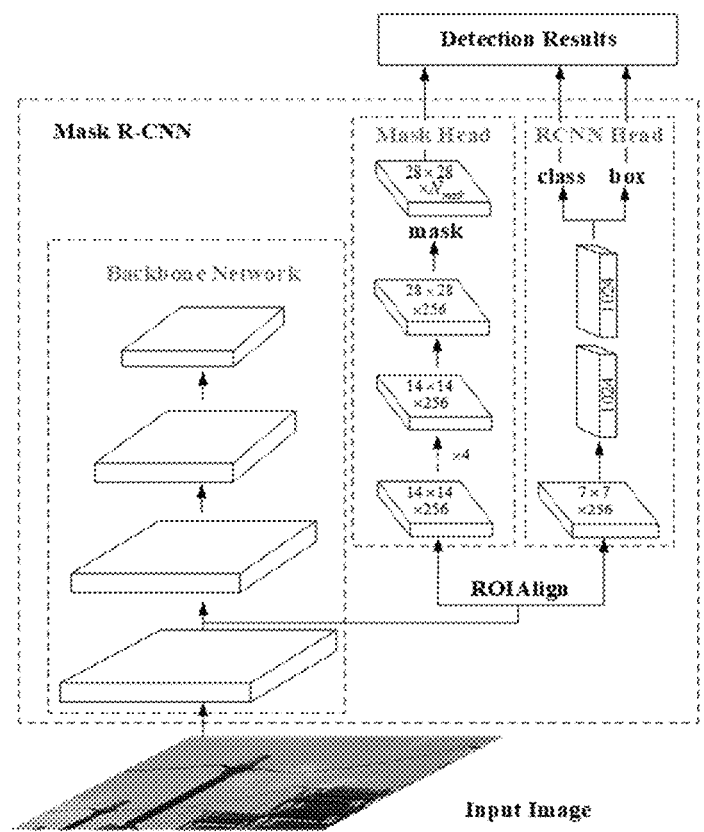
FIG. 2 depicts a schematic diagram of the overall framework of the high-precision identification method for substations according to the first embodiment of the present invention.

Referring to FIG. 2, in layman's terms, the Mask RCNN objection recognition network is a pixel-level segmentation network segmentation. Compared with the Faster RCNN network that can only give the bounding box of the object, the Mask RCNN objection recognition network can accurately find the pixel point corresponding to the object. As shown in FIG. 2, the image information was inputted into the Mask RCNN for preliminary recognition, and the semantic decision tree was based on the recognition of Mask RCNN to correct the preliminary recognition results (i.e. recognition results of the object) according to the relative correlation between different objects, thereby improving the recognition accuracy.

Figure 3:
FIG. 3 depicts a schematic diagram of the Mask RCNN recognition result of the high-precision identification method for substations according to the first embodiment of the present invention.
Figure 4:
FIG. 4 depicts a schematic diagram of the recognition result of high-precision identification method for substations according to the first embodiment of the present invention.

Referring to FIG. 3, recognition results of the Mask RCNN include type and position, where the position is defined as a rectangle (x, y, w, h), (x, y) is the center of the rectangle, and w and h are the length and width of the rectangle. Specifically, the position can be divided into orientation (x, y) and size w*h; Referring to FIG. 4, for each recognized object, the present method creates a decision tree with the object to be recognized as the center, inputs the information of the central object and other objects in its adjacent area, and outputs the correction result corresponding to the center object.

Furthermore, the adjacent area is a circle with the object as the center and a radius of α, and α is selected from the following:

$$\frac{0.1(H+W)}{2}, \frac{0.2(H+W)}{2}, \frac{0.3(H+W)}{2}, \frac{0.4(H+W)}{2}, \frac{0.5(H+W)}{2},$$

where H is the height of the image, and W is the width of the image.

Preferably, it should also be explained in this embodiment that traditional Mask RCNN profile extraction and recognition method obtains a Mask RCNN model through training, which inputs the RGB images of the object contour to be extracted into the Mask RCNN model for semantic segmentation. Mask RCNN model uses network processing to obtain binary mask image corresponding to the RGB images. The RGB image and their corresponding binary mask image are then inputted into the contour refinement module to extract the contour. The main technical problem solved is for image blur, incomplete contour extraction and segmentation due to low resolution, so it is only suitable for image detection and segmentation. It is not applicable to the condition that the image samples of the existing power equipment are few. Even if the recognition result is obtained, its accuracy rate is relatively low, which cannot reach the level of industrial application, and the application effect is not ideal; and the present method adds a semantic decision tree on the basis of quoting the Mask RCNN objection recognition network model, and uses the relative correlation between substations to perform secondary analysis and recognition on the features segmented and extracted by the Mask RCNN objection recognition network model. Even under the condition of few image samples, it still has high recognition accuracy; Referring to FIG. 3 and FIG. 4, the darker color indicates correct recognition, and the lighter color indicates incorrect recognition. According to the schematic diagrams in FIG. 3 and FIG. 4, it can be seen intuitively that the present method can obtain more correct types than the Mask RCNN individual recognization method, which shows that the method of the present invention has higher accuracy than the traditional Mask RCNN method.

Preferably, in order to better verify and explain the technical effects used in the present method, this embodiment conducts a comparative test on the traditional Mask RCNN contour extraction and recognition method and the method of the present invention, and compares the experimental results by means of scientific demonstration to verify the true effect of the method in this disclosure; the traditional Mask RCNN contour extraction and recognition method has low recognition accuracy, low applicability, and incomplete applicability. In order to verify that the present method has higher recognition accuracy compared to the traditional method, this embodiment uses traditional Mask RCNN contour extraction and recognition method and the presently claimed method respectively to test the true type recognition of the substations.

Test conditions: (1) 450 images of substations were used for verification, where 300 images were randomly selected as training sets, and the remaining 150 images were used as test sets;

(2) the types of substations in the images include transformer, GIS, casing, insulator, switch, circuit breaker, mutual inductor, capacitor;

(3) the present method and the traditional method are respectively trained on the training sets and tested on the test sets, and an automated test equipment was turned on and MATLB was used for simulation.

The test results are as follows:

TABLE 1 two methods are tested to compare the recognition rate of the equipment.

| Type of equipment | Present method % | Traditional Mask RCNN method % |
|---|---|---|
| Transformer | 0.880 | 0.661 |
| GIS | 0.792 | 0.622 |
| Casing | 0.871 | 0.754 |
| Insulator | 0.884 | 0.736 |
| Switch | 0.786 | 0.481 |
| Circuit breaker | 0.858 | 0.632 |
| Mutual inductor | 0.829 | 0.733 |
| Capacitor | 0.910 | 0.860 |
| Average value | 0.851 | 0.685 |

TABLE 2 average recognition rate varies with the size of the training set.

| Number of training set (sheet) | Present method % | Traditional Mask RCNN method % |
|---|---|---|
| 400 | 0.890 | 0.791 |
| 350 | 0.872 | 0.724 |
| 300 | 0.851 | 0.685 |
| 200 | 0.809 | 0.621 |
| 100 | 0.749 | 0.584 |
| 150 | 0.701 | 0.507 |

Referring to Table 1, it could be seen intuitively that the recognition accuracy rate of each category in the images of the substations obtained by using the present method was greater than the one obtained by using the traditional method. In order to prove that the present method is suitable for learning under small samples, this embodiment changed the number and size of the training sets and obtained the accuracy rate that was varied with different sizes of the training sets; Referring to Table 2, it could be seen that the present method still maintains higher accuracy rate when the number of training sets is less.

Since the different types of features extracted by the convolutional neural network are reduced in the case of fewer training samples, the training parameters are insufficient, which may easily lead to misjudgment of the equipment category. There is a strong correlation between the substations, so the present method introduces such relationship information, and corrects the recognition result of the equipment through the objects around it, thereby greatly improving the accuracy.

Example 2

Figure 5:
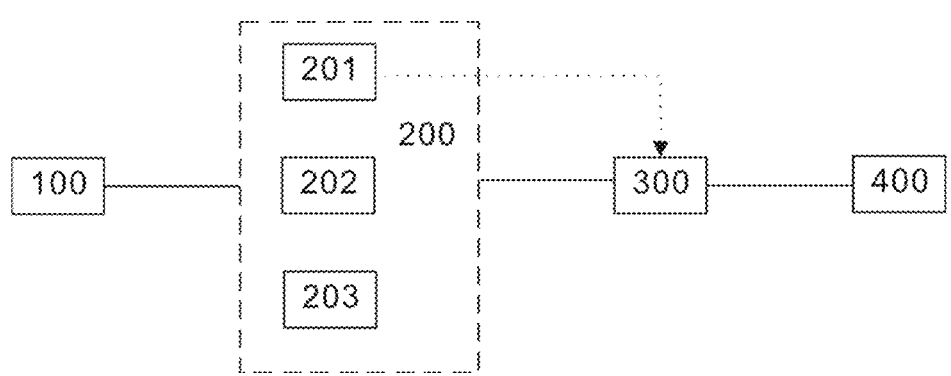
FIG. 5 depicts a schematic diagram of the module structure distribution of the high-precision identification method for substations according to the second embodiment of the present invention.

Referring to FIG. 5, which shows a second embodiment of the present invention. This embodiment is different from the first embodiment in that it provides a high-precision identification system for substations, including:

An acquisition module (100) acquiring an image information and related relationship information between the substations.

A data processing center module (200) is connected to the acquisition module (100) for receiving, calculating, storing, outputting the data information to be processed. The data processing center module (200) includes an arithmetic unit (201), a database (202) and an input-output management unit (203), the arithmetic unit (201) connects to the acquisition module (100) for receiving the data information obtained from the acquisition module (100) to perform correction and normalization and calculate the type, size and position data; the database (202) connects to each module for storing all the received data information to provide the data processing center module (200) an allocation and supply service; the input-output management unit (203) receives information of each module and outputs an operation result of the arithmetic unit (201).

An analysis and judgment module (300) is connected to the data processing center module (200) for receiving the operation result of the arithmetic unit (201), and through three judging criteria including recalling a decoder to analyze and determine whether it belongs to a set $S_C$, whether the size exceeds a threshold $T_s$, whether the position is in a region of $R_p$, and summarize the result to judge the true type of a central object.

A display module (400) is connected to the analysis and judgment module (300) for reading the judgment result of the analysis and judgment module (300) to perform data presentation.

Preferably, the acquisition module (100) is a communication module based on a platform of remote data acquisition, which integrates communication chips and memory chips on a circuit board, so that it has the functions of sending and receiving information, communication and data transmission through the platform of remote data acquisition, and the computer, single-chip computer, and ARM are connected to the platform of remote data acquisition by RS232 serial port, and then the acquisition module (100) is controlled by AI commands to realize the data communication function.

Preferably, it should also be noted that the data processing center module (200) is mainly divided into three levels, including a control layer, an arithmetic layer and a storage layer. The control layer is a command and control center of the data processing center module (200), which consists of an instruction register IR, an instruction decoder ID and an operation controller OC. The control layer can sequentially extract each instruction from the memory and place them in the instruction register IR according to the procedure preprogrammed by the user for analysis and determination through the instruction decoder, and then the operation controller OC receives the notification and executes the operation, which sends a micro-operation control signal to the corresponding component according to the determined time sequence; the arithmetic layer is the core of the data processing center module (200), which can perform arithmetic operations (e.g., addition, subtraction, multiplication, division and additional operations) and logical operations (e.g., shifting, logical test or comparison between two values). The arithmetic layer is connected to the control layer and performs arithmetic operations by receiving control signals from the control layer; the storage layer is a database of the data processing center module (200), which can store data (the data to be processed and processed).

Preferably, the Mask RCNN objection recognition network includes a basic network, a region generative network, a taxonomy branch and a mask branch. The Mask RCNN objection recognition network is used to extract image features to classify the images. The basic network is used to extract image features for subsequent network. The region generative network is used to predict where the object appears, and the result of the prediction is the bounding box of the object. The taxonomy branch is used to classify the predicted objects in the bounding box. The mask branch is used to position the pixel point where the predicted object in the bounding box is located (the mask is the matrix corresponding to the pixel point where the object is located).

It should be recognized that the embodiments of the present invention can be realized or implemented by computer hardware, a combination of hardware and software, or by computer instructions stored in a non-transitory computer readable memory. The said method can be implemented in a computer program by using standard programming techniques (including a non-transitory computer-readable storage medium configured with a computer program), where such storage medium allows the computer to operate in a specific and predefined way—according to the methods and drawings described in the specific embodiment. Each program can be implemented in a high-level process or object-oriented programming languages to communicate with the computer system. However, if necessary, the program can be implemented in assembly or machine languages. In any case, the language can be a compiled or interpreted language. Moreover, the program can be run on a programmed application specific integrated circuit for this purpose.

In addition, the operations of the process described herein can be performed in any suitable order. Unless otherwise indicated in this article or otherwise clearly contradict the context, the processes (or variants and/or a combination thereof) described herein can be executed under the control of one or more computer systems configured with executable instructions, and can be used as a code that is executed collectively on one or more processors (e.g., executable instructions, one or more computer programs, or one or more applications), implemented by hardware or a combination thereof. The computer program includes a plurality of instructions executed by one or more processors.

Further, the method can be implemented in any type of computing platform that is operably connected to a suitable computing platform, including but not limited to personal computers, minicomputers, main frame, workstation, network or distributed computing environment, single or integrated computer platforms, or communicating with charged particle tools or other imaging devices, etc. Any aspect of the present invention can be implemented by a machine-readable code stored on a non-transitory storage medium or device whether it is mobile or integrated into a computing platform (such as hard disk, optically readable and/or writing storage media, RAM, ROM, etc), so that they can be read by a programmable computer. When the storage medium or device is read by a computer, it can be used to configure and operate the computer to perform the processes described herein. Moreover, the machine-readable code or part of it can be transmitted through a wired or wireless network. When such medium including a microprocessor or other data processors implements the instructions or programs of the steps described above, the invention described herein includes these and other different types of non-transitory computer-readable storage media. When programming is performed using the methods and techniques according to the present invention, the present invention also includes the computer itself. A computer program can be applied to input data to perform the functions described herein, thereby converting the input data to generate output data that is stored in non-volatile memory. The output information can also be applied to one or more output equipment, such as displays. In a preferred embodiment of the present invention, the converted data represents physical and tangible objects, including specific visual depictions of physical and tangible objects generated on the display.

The terms "component", "module", "system" or alike used in this disclosure are intended to refer to computer-related entities, which can be a hardware, a fastener, a combination of hardware and software, a software or a software in operation. For example, the component is expected to include, but not limit to, a process, a processor, an object, an executable file, an executing thread, a program and/or a computer run on the processor. As an example, both the application running on the computing equipment and the computing equipment can be components. The one or more components can exist in the executing process and/or thread, and the components can be located in one computer and/or distributed between two or more computers. Moreover, these components are able to execute from various computer readable media having various data structures thereon. These components can communicate in a local and/or remote process, such as based on a signal with one or more data packets (e.g., data from a component, which interacts with another component in a local system, a distributed system, and/or interacts with other systems via a network such as the internet in a signal manner).

It is worth noting that the foregoing examples are only used for illustration of the technical solutions of the present invention and non-limiting thereto. Though reference is made to preferred examples for detailed illustration of the present invention, a skilled person in the art should understand that the technical solutions provided by the present invention can vary or be substituted by equivalents without departing from the spirit and scope of the technical solutions described herein, which should fall within the scope of the appended claims.

What is claimed is:

1. A high-precision identification method for substations, comprising:
    building a Mask RCNN objection recognition network model based on convolutional neural networks;
    inputting acquired image information of an object into the Mask RCNN object recognition network model for preliminary recognition and outputting a recognition result of the object;
    using an information entropy to create a semantic decision tree and correcting the recognition result of the object according to the principle of relative correlation between different objects and outputting a final recognition decision result;
    reading the recognition decision result to obtain a true type of the object to be recognized.

2. The method according to claim 1, wherein the method of building the Mask RCNN objection recognition network model comprising,
    superimposing a plurality of residual network ResNet, $y=F(x)+x$;
    establishing a region generative network, $P_i=FC_2[FC_1[Pooling(f,R_i)]]$, and setting a threshold of 0.5, keeping a candidate region if $P_i$ exceeds 0.5, and discarding the candidate region if $P_i$ is lower than 0.5;
    generating a taxonomy branch, $P_c^i=FC_4[FC_3[Pooling(f,R_i')]]$;
    generating a mask branch, $M_i=FC_6[FC_5[Pooling(f,R_i')]]$;
    wherein, y is an output of the residual network, x is an input of the residual network, F is a convolution function, f is an image feature outputted by the residual network, $R_i$ is the candidate region, Pooling is pooling, $FC_1$ and $FC_2$ are first and second fully connected layers, respectively, $P_i$ is probability of candidate region $R_i$ belonging to a foreground (i.e., the region containing the object to be recognized), $R_i'$ is kept candidate region, $FC_3$ and $FC_4$ are third and fourth fully connected layers, respectively, $P_c^i$ is probability of the object c to be recognized in the candidate region $R_i'$, $FC_5$ and $FC_6$ are fifth and sixth fully connected layers, respectively; a matrix $M_i$ has pixel size identical to the candidate region $R_i'$, and each position in the $M_i$ represents a probability that the pixel point belongs to the recognized object in the candidate region.

3. The method according to claim 1, wherein the preliminary recognition comprising,
    using the residual network to extract the image feature;
    positioning the object to be recognized by the region generative network using a corresponding image feature(s), and sending the respective feature(s) of the positioned region into the taxonomy branch and the mask branch;
    recognizing the type of the object to be recognized through the taxonomy branch; and
    positioning the pixel point of the object to be recognized in the image through the mask branch.

4. The method according to claim 3, wherein the recognition result of the object comprises a type, an orientation and a size thereof.

5. The method according to claim 4, wherein the image information needs to be pre-processed, comprising,
normalizing the orientation and the size of other objects in an adjacent area of a central object; and
positioning the orientation and the size of the central object as $d_p^o$ and $d_s^o$, respectively, wherein the normalized orientation and size are as follows:

$$d'^i_p = d^i_p - d^o_p,$$

$$d'^i_s = d^i_s / d^o_s.$$

6. The method according to claim 1, wherein the semantic decision tree comprises an input layer and an output layer, wherein the input layer comprises information of the central object and the other objects within the same region thereof; the output layer comprises a correction result corresponding to the center object.

7. The method according to claim 6, wherein the method of creating the semantic decision tree comprises type and position information of each object as follows:

$$d = \{d_c, d_p, d_s\},$$

wherein $d_c$ is a recognition category, $d_s$ is a recognition size, and $d_p$ is a recognition orientation;
combining the normalized orientation and size, and fusing the corresponding correction results of the central object to create the semantic decision tree, as follows:

$$g_c^{(i)} = \text{Tree}(d_c^{(i)}, d_c^{(i1)}, d'^{(i1)}_p, d'^{(i1)}_s, \quad \ldots \quad , d_c^{(in)}, d'^{(in)}_p, d'^{(in)}_s),$$

wherein $d^{(i)}$ is the central objection, $d^{(i1)} \ldots d^{(in)}$ are other objects within the same region of the central object, and $g_c^i$ is the semantic decision tree.

8. The method according to claim 7, wherein the correction comprises,
defining the objection recognition result as a total of N objects $d_c^i$ (i=1 N), and using the semantic decision tree to correct each of the N objects, respectively;
generating the following three judging criteria with respect to recognition category, recognition size and recognition orientation, respectively:
$d_c \in S_C$, for determining whether it belongs to a set $S_C$;
$d_s > T_s$, for determining whether the size exceeds a threshold $T_s$;
$d_p \in R_p$, for determining whether the position is in a region of $R_p$;
determining whether an attribute of the image information satisfies input conditions according to the three judging criteria, and using a number that satisfies the three criteria to judge the true type of the central object.

9. The method according to claim 8, wherein the recognition decision result is the result corrected by the semantic decision tree as follows:

$$g_c^i (i=1 \wedge N),$$

wherein N is the number of the objects in the recognition result.

10. A high-precision identification system for substations, comprising:
an acquisition module (100) acquiring an image information and related relationship information between the substations;
a data processing center module (200) is connected to the acquisition module (100) for receiving, calculating, storing, outputting the data information to be processed, wherein the data processing center module (200) comprises an arithmetic unit (201), a database (202) and an input-output management unit (203), the arithmetic unit (201) connects to the acquisition module (100) for receiving the data information obtained from the acquisition module (100) to perform correction and normalization and calculate the type, size and position data; the database (202) connects to each module for storing all the received data information to provide the data processing center module (200) an allocation and supply service; the input-output management unit (203) receives information of each module and outputs an operation result of the arithmetic unit (201);
an analysis and judgment module (300) is connected to the data processing center module (200) for receiving the operation result of the arithmetic unit (201), and through three judging criteria including recalling a decoder to analyze and determine whether it belongs to a set $S_C$, whether the size exceeds a threshold $T_s$, whether the position is in a region of $R_p$, and summarize the result to judge the true type of a central object; and
a display module (400) is connected to the analysis and judgment module (300) for reading the judgment result of the analysis and judgment module (300) to perform data presentation.

* * * * *